Oct. 6, 1936.  F. ACCARDI  2,056,440
ALL-METAL AUTOMOBILE DOOR
Filed July 26, 1935
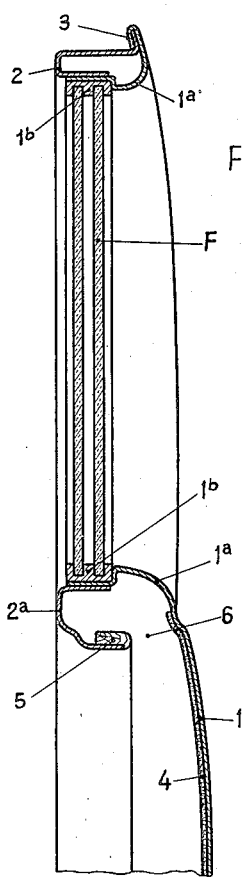
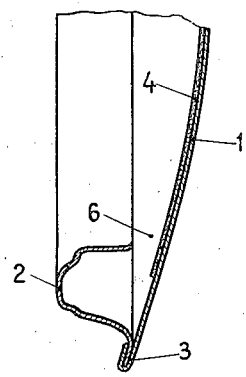
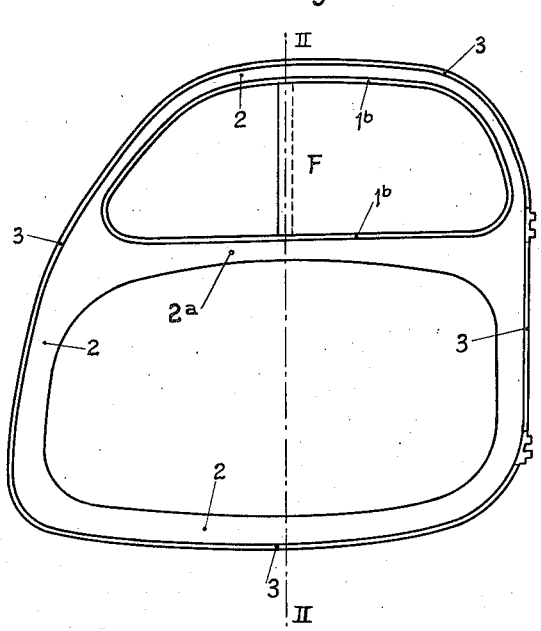
Inventor
Ferruccio Accardi
By Sommers & Young
Attys Patented Oct. 6, 1936

2,056,440

UNITED STATES PATENT OFFICE 2,056,440

ALL-METAL AUTOMOBILE DOOR

Ferruccio Accardi, Turin, Italy, assignor to Fiat Società Anonima, Turin, Italy

Application July 26, 1935, Serial No. 33,404
In Italy February 20, 1935

1 Claim. (Cl. 296—44)

This invention relates to an automobile door of pressed sheet metal, simple and strong in construction and smart in appearance. The door is composed of an external and an internal sheet metal member. The external member is bored to form the window.

The internal member consists of a frame following the door contour, subdivided by a cross member extending below the window opening. The two members are connected together in such manner that both the window opening and the door panel are encircled by a hollow frame. The wall of the frame encircling the door panel is not of closed section but leaves towards the inside of the door a slit receiving the edges of the cloth or other covering applied to the inner face of the door panel.

The accompanying drawing shows by way of example a manner of carrying out the invention.

Figure 1 is an elevation of the door from the inside.

Figure 2 is a vertical section on the line II—II of Fig. 1, on an enlarged scale.

The door is composed of two sheet metal members. The external member forms below the door panel 1 to which the window frame 1a is connected. The frame 1a supports the guides 1b for the horizontally slidable window glass panel.

The internal sheet member forming the framework of the door is constituted by a frame 2 of approximatively U-shaped section, following the door contour and subdivided below the window opening by a cross member 2a which has also an approximately U-shaped section.

The internal and external members are connected by a folded seam 3 along the outer door edge. This seam forms a strong rabbet for the door. Weld points can be made on the sheet metal members on the seam 3.

The two members are further welded together along the frame of the window opening, on the rear face of the portion of the wall 1a which supports the guides 1b.

This imparts to the upper and lateral frame sides of the window opening a closed tubular section.

The rear face of the door panel 1 is covered with cloth 4. To disguise the edges of the covering 4, the panel frame instead of being of closed tubular section, leaves free all round a slit 6, into which said edges fit. The remaining portions of the door are simply lacquered.

The slit 6 of the upper cross member 2a of the door is wide enough to serve at the same time as hold for closing the door. For the same purpose the edge of the slit in the cross member 2a is provided on part of or all its length with a fitting 5 of wood, moulded mass, or the like.

What I claim is:

A metallic automobile door having a window, comprising an outside member of pressed sheet metal having an upper aperture for the window and a lower panel, an inside frame member of channel section of pressed sheet metal rigidly fixed to the edge of the outside member and having a cross member which subdivides the space within the frame member in a lower and an upper aperture, the frame member being detached from the panel at part of its periphery and a covering on the inside face of the panel, the peripheral edge of which extends in the space between the outer member and the frame member through the space between the panel and the inner edge of the lower aperture of the frame member.

FERRUCCIO ACCARDI.